(12) United States Patent
Hulvey (10) Patent No.: US 10,185,535 B2
(45) Date of Patent: *Jan. 22, 2019

(54) INTERMEDIARY DEVICE FOR ESTABLISHING WIRELESS SERVICES

(71) Applicant: Avago Technologies General IP (Singapore) Pte. Ltd., Singapore (SG)

(72) Inventor: Robert William Hulvey, Redondo Beach, CA (US)

(73) Assignee: Avago Technologies International Sales PTE. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/045,132

(22) Filed: Feb. 16, 2016

(65) Prior Publication Data

US 2016/0162258 A1 Jun. 9, 2016

Related U.S. Application Data

(63) Continuation of application No. 13/721,252, filed on Dec. 20, 2012, now Pat. No. 9,294,158.

(Continued)

(51) Int. Cl.
*H04B 7/00* (2006.01)
*G06F 3/16* (2006.01)
(Continued)

(52) U.S. Cl.
CPC ............. *G06F 3/165* (2013.01); *H04B 7/00* (2013.01); *H04L 67/141* (2013.01); *H04L 67/16* (2013.01)

(58) Field of Classification Search
CPC ............. H04L 67/16; H04L 2012/2841; H04L 2012/2849; H04L 65/103; H04L 65/4076; H04L 65/605; H04N 21/4126; H04N 21/43637; H04W 88/08; H04W 12/06; H04W 60/00; H04W 72/1215; H04W 74/00; H04W 84/10; H04W 88/16;
(Continued)

(56) References Cited

U.S. PATENT DOCUMENTS 7,937,742 B2 5/2011 Jung
7,948,991 B1 5/2011 Hart et al.
(Continued)

FOREIGN PATENT DOCUMENTS

CN 101321247 A 12/2008
CN 101534449 A 9/2009
WO WO-2011/085407 A1 7/2011

OTHER PUBLICATIONS

European Search Report from European Application No. 13003079.4, dated Sep. 8, 2017, 4 pages.

*Primary Examiner* — Norman Yu
(74) *Attorney, Agent, or Firm* — Morgan, Lewis & Bockius LLP (57) ABSTRACT

Various embodiments are disclosed for facilitating reception of a digital audio stream over a wireless personal area network (PAN). At a wireless network mobile computing device, a wireless network audio broadcast device is discovered. The wireless network audio broadcast device is operable to provide a digital audio stream over a wireless PAN. The wireless network mobile computing device facilitates the reception of the digital audio stream over the wireless PAN by a wireless network audio listening device.

20 Claims, 9 Drawing Sheets

Related U.S. Application Data (60) Provisional application No. 61/680,392, filed on Aug. 7, 2012.

(51) Int. Cl.
  *H04L 29/08* (2006.01)
  *H04W 12/06* (2009.01)

(58) Field of Classification Search
  CPC ........ H04W 8/005; H04W 92/02; H04B 7/00;
        H04H 20/106; H04H 2201/90; H04M
        15/8235; H04M 1/6066; H04M 1/72547;
        H04M 2250/02; H04M 2250/06; H04M
        3/42068
  USPC ........... 455/41.2, 435.1, 414.1, 426.1, 435.2,
        455/552.1; 370/338, 908
  See application file for complete search history.

(56) References Cited

U.S. PATENT DOCUMENTS

| | | | |
|---|---|---|---|
| 8,155,590 | B2 | 4/2012 | Hong |
| 8,340,710 | B2* | 12/2012 | Gupta ................ H04L 29/1216 370/338 |
| 8,640,181 | B1 | 1/2014 | Inzerillo |
| 2003/0161292 | A1 | 8/2003 | Silvester |
| 2003/0186645 | A1* | 10/2003 | Mori ...................... H04H 60/40 455/3.01 |
| 2003/0191292 | A1 | 10/2003 | Winge |
| 2004/0116141 | A1 | 6/2004 | Loven et al. |
| 2005/0239445 | A1 | 10/2005 | Karaoguz et al. |
| 2006/0224519 | A1* | 10/2006 | Ahn ...................... H04L 63/061 705/57 |
| 2007/0242650 | A1* | 10/2007 | Fujiwara ........... H04W 72/0406 370/341 |
| 2008/0177972 | A1* | 7/2008 | Tan ...................... G06F 12/109 711/171 |
| 2009/0103731 | A1* | 4/2009 | Sarikaya ............... H04L 63/065 380/270 |
| 2009/0312010 | A1 | 12/2009 | Hall |
| 2010/0271959 | A1* | 10/2010 | Qi ........................... H04L 41/12 370/248 |
| 2011/0103609 | A1 | 5/2011 | Pelland et al. |
| 2011/0296468 | A1 | 12/2011 | Pettit et al. |
| 2012/0077506 | A1* | 3/2012 | Wietfeldt .............. H04W 72/02 455/450 |
| 2013/0065637 | A1 | 3/2013 | Tasker |
| 2013/0074168 | A1* | 3/2013 | Hao ...................... H04L 9/3213 726/7 |
| 2013/0163444 | A1* | 6/2013 | Tee ........................ H04L 69/40 370/252 |
| 2014/0044276 | A1 | 2/2014 | Hulvey et al. |

\* cited by examiner

INTERMEDIARY DEVICE FOR ESTABLISHING WIRELESS SERVICES

CROSS REFERENCE TO RELATED APPLICATIONS

This application is a continuation of U.S. application Ser. No. 13/721,252, entitled "Broadcast Audio Service," filed Dec. 20, 2012, which claims the benefit of U.S. Provisional Application No. 61/680,392, entitled "Public Audio Service," filed Aug. 7, 2012, which are hereby incorporated by reference in their entirety.

BACKGROUND

Audio sources such as televisions and radios are provided in many public or commercial spaces such as hotels, airports, restaurants, bars, etc. In some settings, the audio source sound is kept at a low volume, so as not to disturb customers or patrons. In some settings, the sound is even turned off. Users interested in watching the television programming, or listening to the radio programming, must then move closer to the source or ask the proprietor or employee of the establishment to adjust the volume.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to audio programming such as that provided via radio or television, and more specifically to a service that facilitates consumption of such audio programming.

Figure 1:
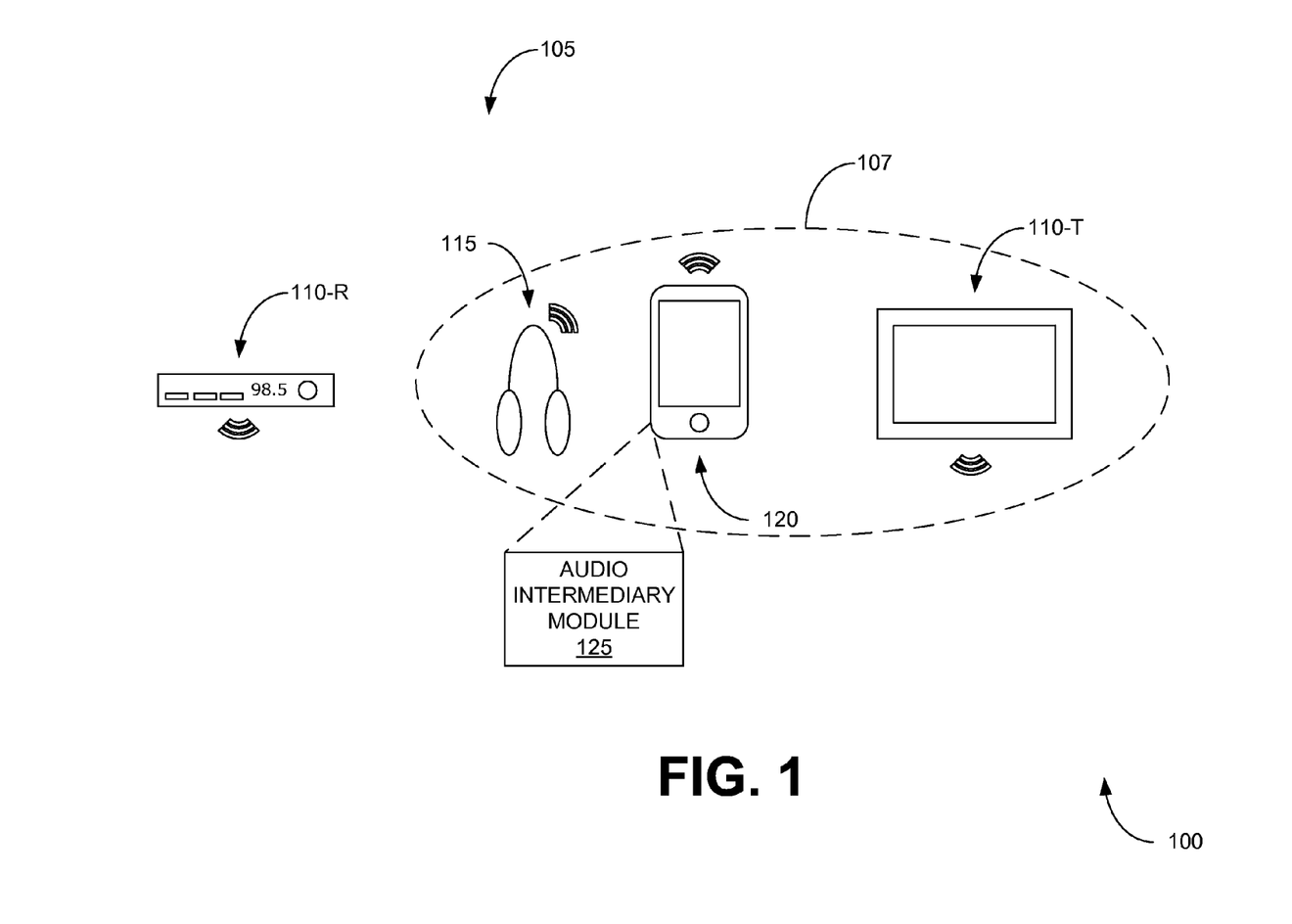
FIG. 1 is a diagram illustrating a system that supports wireless devices according to some embodiments disclosed herein.

FIG. 1 is a system diagram illustrating a portion of a system 100 that supports wireless devices operating according to some embodiments disclosed herein. The system 100 includes multiple wireless devices residing within in a wireless personal area network (PAN) 105. Wireless PAN systems generally replace cumbersome cabling used to connect peripheral devices or mobile terminals by providing short distance wireless links that allow connectivity within very narrow spatial limits (typically, a 10-meter range). Various technologies can be used to implement the components of the system 100 as should be appreciated. A non-limiting list of technologies which can be used to implement wireless PAN 105 includes Bluetooth®, IEEE 802.15.1, 802.15.4, Zigbee, and Wireless Universal Serial Bus™. For some wireless PAN technologies, a wireless device registers with or joins a wireless PAN 105 before transmitting or receiving on the wireless PAN 105. Wireless devices become known to one another through this registration process. However, some technologies also allow a wireless device to transmit or receive via the network without registering or joining. As used herein, "transmitting over the wireless PAN" refers to transmission by a wireless device that is located within range, or in the coverage zone 107, of the wireless PAN 105, regardless of whether the transmitter has become a member of the wireless PAN 105. Similarly, "receiving over the wireless PAN" refers to reception by a wireless device that is located within range of, or in the coverage zone of, the wireless PAN 105, regardless of whether the receiver has become a member of the wireless PAN 105.

Wireless devices residing within the wireless PAN 105 may include, for example, one or more wireless network audio broadcast devices 110, one or more wireless network audio listening devices 115, and one or more wireless network mobile computing devices 120. A wireless network audio broadcast device 110 outputs a digital audio stream over wireless PAN 105 for consumption by a wireless network audio listening device 115. Using techniques described herein, an audio intermediary module 125 within wireless network mobile computing device 120 acts as an intermediary to facilitate this consumption. For example, the audio intermediary module 125 may provide a mechanism for a user to select a wireless network audio broadcast device 110. In some embodiments, the audio intermediary module 125 forwards the selected digital audio stream to a wireless network audio listening device 115. In other embodiments, the audio intermediary module 125 provides identifying information so that the wireless network audio listening device 115 can receive the digital audio stream directly from the selected wireless network audio broadcast devices 110.

The intermediary techniques disclosed herein can be particularly advantageous to wireless network audio listening devices 115 that are not capable of receiving, or are not programmed to receive, broadcasts via the wireless PAN. By having the wireless network mobile computing device 120 receive and forward broadcast audio streams, such legacy listening devices nonetheless benefit from digital audio broadcasts. Similarly, the intermediary techniques disclosed herein can be particularly advantageous to wireless network audio listening devices 115 that are not capable of exchanging, or are not programmed to exchange, capabilities information with a wireless network audio broadcast device 110. Such legacy listening devices can nonetheless render audio being broadcast by a wireless network audio broadcast device 110 once the wireless network mobile computing device 120 receives identifying information from the wireless audio network audio broadcast device 110 and provides that information to the legacy listening device 115.

A wireless network mobile computing device 120 may take the form of a cellular telephone, a tablet computer, a notebook computer, a media player, a game station, or any other computing device that is mobile and supports a wireless PAN connection. In the example shown in FIG. 1, the wireless network audio broadcast device 110-T takes the form of a television and the wireless network audio broadcast device 110-R takes the form of a radio receiver but other sources of digital audio are also applicable. In some embodiments, a wireless network audio broadcast device 110 receives programming on a media channel and outputs audio associated with this programming. However, in other embodiments, a wireless network audio broadcast device 110 plays back stored audio (e.g., a digital jukebox). In the example embodiment of FIG. 1, the wireless network audio listening device 115 takes the form of headphones, but the wireless network audio listening device 115 may make other forms, such as a single-ear headset or speakers. As another example, the wireless network audio listening device 115 make take the form of a hearing aid, using one of a variety of coupling technologies such as telecoil. A wireless network audio listening device 115 may support mono or stereo sound.

Figure 2:
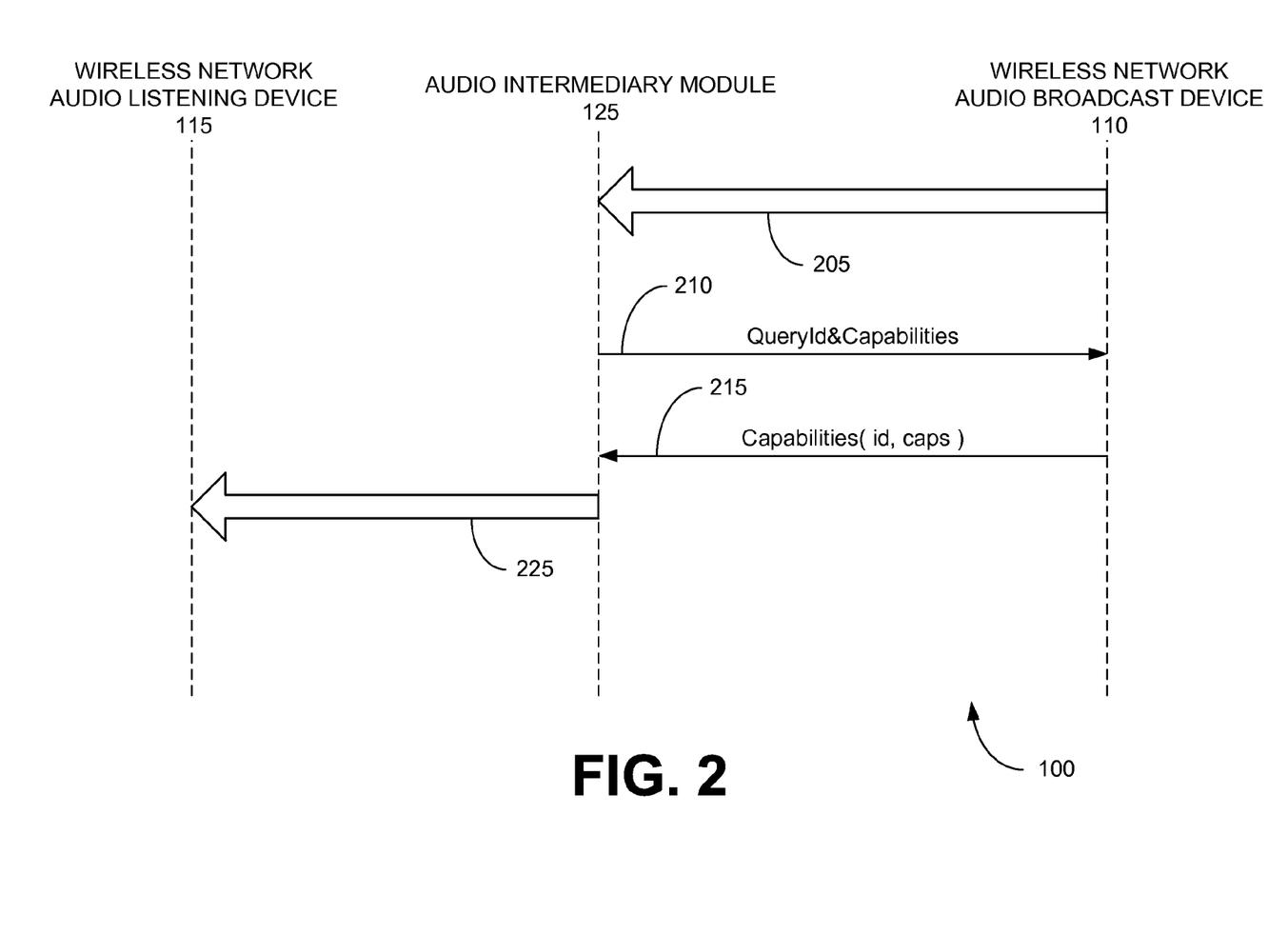
FIG. 2 is a messaging diagram showing interaction between various components of the system of FIG. 1, according to some embodiments disclosed herein.

FIG. 2 is a messaging diagram showing interaction between various components of the system 100 in an example scenario, according to some embodiments disclosed herein. In this scenario, the audio intermediary module 125 within the wireless network mobile computing device 120 (FIG. 1) discovers a wireless network audio broadcast device 110, receives a digital audio stream from the wireless network audio broadcast device 110, and forwards the digital audio stream on to the wireless network audio listening device 115. Another scenario will be discussed later, in which the audio intermediary module 125 does not act as a forwarder, but instead provides the wireless network audio broadcast device 110 and/or the wireless network audio listening device 115 with information that allows the wireless network audio listening device 115 to receive the digital audio stream directly from the wireless network audio broadcast device 110.

In the example scenario shown in FIG. 2, the wireless network audio broadcast device 110 provides a broadcast digital audio stream 205 independent of any particular request for the stream 205, and independent of devices already connected to the wireless network audio broadcast device 110. In some embodiments, any listening device may discover the broadcast digital audio stream 205 by listening to the wireless network audio broadcast device 110. In some embodiments, the wireless network audio broadcast device 110 transmits to a predefined broadcast address or set of broadcast addresses.

In some embodiments, the audio intermediary module 125 listens for the broadcast digital audio stream 205. Having found at least one broadcast from at least one wireless network audio broadcast device 110, the audio intermediary module 125 sends a query message 210 to a wireless network audio broadcast device 110 in order to obtain an identifier and a description of the device's capabilities. The wireless network audio broadcast device 110 responds with a message 215, which includes the requested information. In some embodiments, wireless devices are identified using frequency, time slot, clock, device address such as a media access control (MAC) address, or a combination thereof. Furthermore, the capabilities returned in the message 215 may include a device type, category, or supported profiles.

In some embodiments, query message 210 may be received by multiple wireless network audio broadcast devices 110, and then multiple responses may received by audio intermediary module 125. The responses 215 may serve to enable audio intermediary module 125 to discover the available broadcast digital audio streams 205 in lieu of listening for broadcast digital audio streams for the purposes of discovery.

Once the broadcast digital audio stream 205 has been discovered via the capabilities exchange of messages 210 and 215, the audio intermediary module 125 residing in the wireless network mobile computing device 120 forwards the digital audio stream 205, as digital audio stream 225, to the wireless network audio listening device 115. Whereas transmission of the digital audio stream 205 involves a broadcast by the wireless network audio broadcast device 110, transmission of the digital audio stream 225 typically involves a connection between the audio intermediary module 125 of the wireless network mobile computing device 120 and the wireless network audio listening device 115. In some embodiments, the wireless network audio broadcast device 110 is capable of providing multiple streams, and in such embodiments, a stream identifier or a program identifier may be used by audio intermediary device 125 in order to identify and select the appropriate digital audio stream to forward to wireless network listening device 115.

In the embodiment shown in FIG. 2, transmission of the digital audio stream 205 occurs prior to and independent of the capabilities exchange. In another embodiment, the wireless network audio broadcast device 110 may automatically begin transmission of the digital audio stream 205 after the capabilities exchange has occurred. In still another embodiment, the audio intermediary module 125 makes a specific request (not shown) to the wireless network audio broadcast device 110 to start the transmission of the digital audio stream 205.

The message exchanges shown in FIG. 2 may be implemented in various ways depending on the underlying technology, as may be appreciated. In a Bluetooth® or IEEE 802.15.1 implementation, the capabilities exchange of messages 210, 215 may utilize extended inquiry, inquiry response, and extended inquiry response (EIR) and/or service discovery protocol (SDP) mechanisms. The inquiry, inquiry response and EIR mechanisms may further be used to discover one or more available broadcast digital audio streams in lieu of listening for broadcast digital audio streams for the purpose of discovery. An inquiry response message may include the clock, device address, and Class of Device (e.g., TV, phone, personal computer, etc.). As another example, an extended inquiry response packet may add device name and other information such as the services supported by the wireless network audio broadcast device. In some embodiments, the services supported may indicate support for the discovery, intermediary, and forwarding techniques disclosed herein. In embodiments that do not support an extended inquiry response, the capabilities exchange may involve a partial connection between the audio intermediary module 125 and the wireless network audio broadcast device 110 to discover device identity and a full connection to discover device capability.

Figure 3:
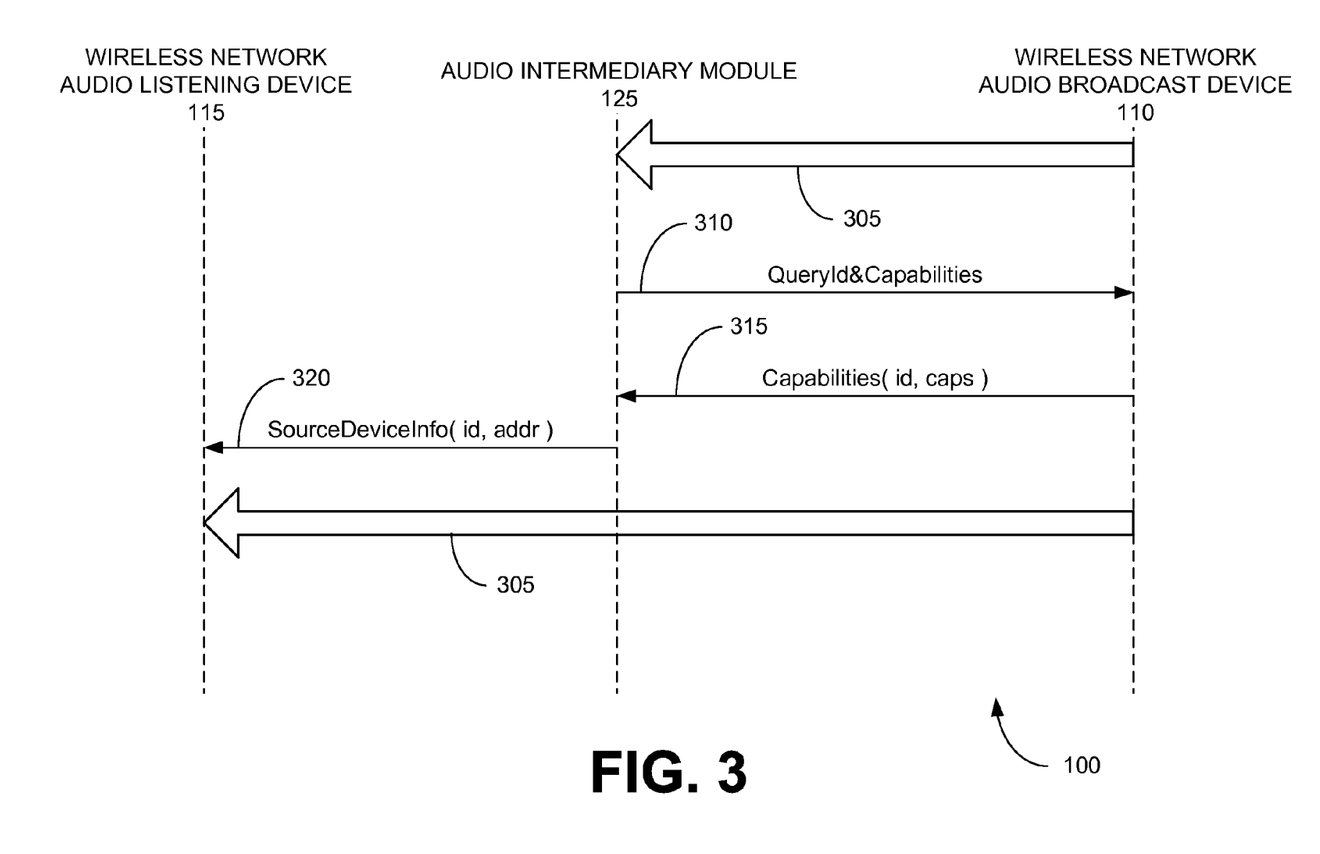
FIG. 3 is another messaging diagram showing interaction between various components of the system of FIG. 1, according to some embodiments disclosed herein.

FIG. 3 is another messaging diagram showing interaction between various components of the system 100 in another example scenario, according to some embodiments disclosed herein. In this scenario, the wireless network mobile computing device 120 (FIG. 1) does not act as a forwarder for a digital audio stream, but instead provides the wireless network audio broadcast device 110 (FIG. 1) and/or the wireless network audio listening device 115 (FIG. 1) with information that allows the wireless network audio listening device 115 to receive a digital audio stream directly from the wireless network audio broadcast device 110. The digital audio stream broadcast by the embodiment of FIG. 3 is similar to that discussed above in connection with FIG. 2. That is, the wireless network audio broadcast device 110 provides a broadcast digital audio stream 305 independent of any particular request for the stream 305, and independent of devices already connected to the wireless network audio broadcast device 110. In one embodiment, the audio intermediary module 125 of the wireless network mobile computing device 120 listens as described herein for the broadcast digital audio stream 305. Having found at least one broadcast, the audio intermediary module 125 learns the identifier of the audio broadcast device through the capabilities exchange of messages 310, 315, which are analogous to the messages 210, 215 discussed earlier in connection with FIG. 2. In another embodiment, audio intermediary device 125 may discover one or more audio source devices 110 using the same mechanism used to perform the capabilities exchange involving messages 310 and 315. Having discovered the wireless network audio broadcast device 110 through messages 310, 315, the audio intermediary module 125 sends a message 320, which informs the wireless network audio listening device 115 of the presence of the wireless network audio broadcast device 110. The message 320 includes sufficient information for the wireless network audio listening device 115 to begin receiving the broadcast digital audio stream 305 being transmitted by wireless network audio broadcast device 110. In some embodiments, the message 315 includes a network or MAC address, frequency, a time slot, a clock, or a combination thereof. In some embodiments, the wireless network audio broadcast device 110 is capable of providing multiple streams, and in such instances message 315 may include a program or stream identifier.

The scenario of FIG. 2 involved wireless network mobile computing device 120 acting as an intermediate forwarding device. In contrast, the scenario of FIG. 3 involves wireless network audio listening device 115 directly receiving the broadcast digital audio stream 305 from wireless network audio broadcast device 110. This typically would allows wireless network mobile computing device 120 containing audio intermediary module 125 to not consume power as a result of receiving and retransmitting the digital audio stream. However, the scenario of FIG. 3 does require that wireless network audio listening device 115 be capable of directly receiving a broadcast digital audio stream. In some embodiments, wireless devices may take on master and slave roles. For example, the wireless network audio broadcast device 110 may act as a master when transmitting the digital audio stream 325, while the wireless network audio listening device 115 receives as a slave. As another example, the wireless network mobile computing device 120 may simultaneously act as a slave to receive from the wireless network audio broadcast device 110 and as a master to transmit to the wireless network audio listening device 115.

As noted above in connection with FIGS. 2 and 3, the audio intermediary module 125 may act as a forwarding intermediary, or may facilitate a direct connection between the wireless network audio broadcast device 110 and the wireless network audio listening device 115. Some embodiments of the audio intermediary module 125 support both behaviors, and dynamically select between the two based on operating conditions. For example, the audio intermediary module 125 may elect to operate as a forwarder when the wireless network audio broadcast device 110 is closer to the wireless network mobile computing device 120 than to the wireless network audio listening device 115. As another example, the audio intermediary module 125 may elect not to operate as a forwarder when the charge on its battery drops below a predefined threshold. As yet another example, the audio intermediary module 125 may elect not to operate as a forwarder when the wireless network audio broadcast device 110 and the wireless network audio listening device 115 are located on the same subnet or piconet.

Figure 4A:
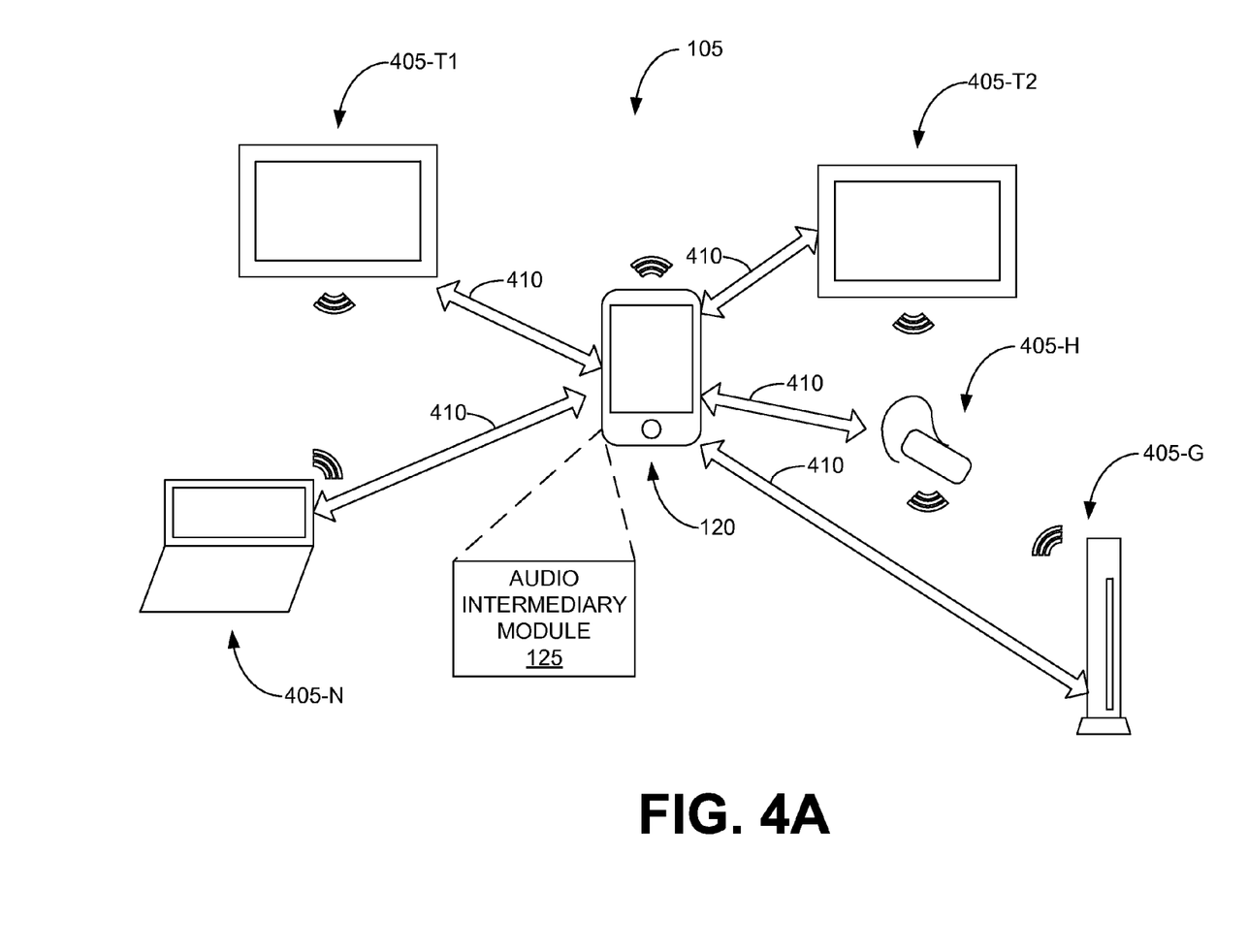
FIGS. 4A and 4B are diagrams showing interaction between various components of the system of FIG. 1, according to some embodiments disclosed herein.
Figure 4B:
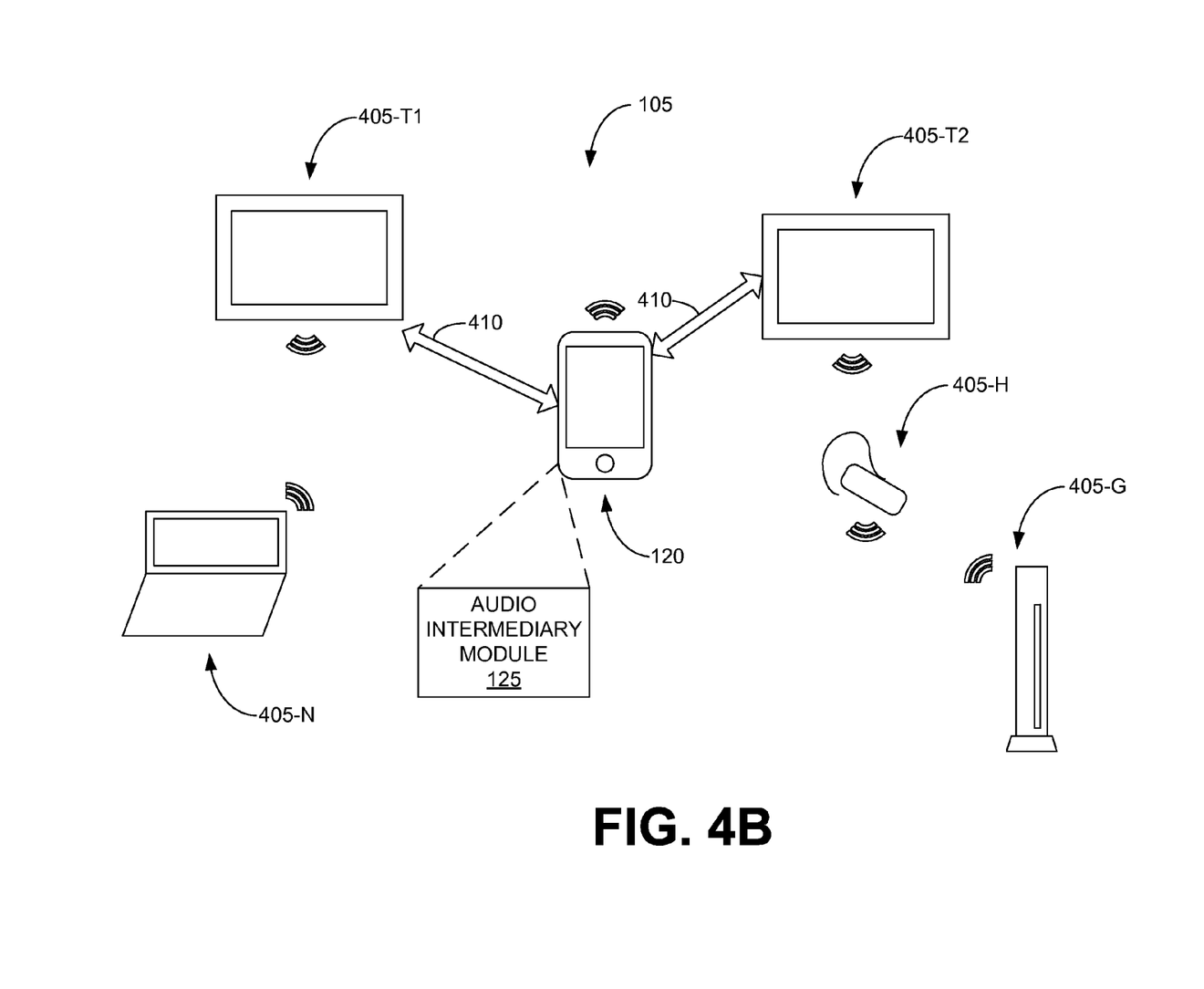

FIGS. 4A and 4B each illustrate interaction between various components of the system 100 in a capabilities gathering scenario, according to some embodiments disclosed herein. In both scenarios, the audio intermediary module 125 gathers capabilities data from wireless devices 405, some of which are wireless network audio broadcast devices 110 (FIG. 1). The audio intermediary module 125 processes the capabilities to present the user with a choice of these wireless network audio broadcast devices 110. In both scenarios, a wireless PAN 105 includes five wireless devices 405 other than the wireless network mobile computing device 120: two televisions 405-T1 and 405-T2; a notebook computer 405-N; a game station 405-G; and a headset 405-H. In the two scenarios illustrated in FIG. 4A and FIG. 4B, different wireless devices 405 are queried.

In the embodiment illustrated in FIG. 4A, the audio intermediary module 125 exchanges capability messages 410 with all wireless devices 405 residing in the wireless PAN 105, thus discovering the presence of five wireless devices 405 residing in the wireless PAN 105. Audio intermediary module 125 then filters the capabilities information to discover the presence of wireless network audio broadcast devices 110 in general, of specific types of wireless network audio broadcast devices 110, or of specific wireless network audio broadcast devices 110. For example, audio intermediary module 125 may look generally for a device type such as "audio source" or "audio broadcast," or may look more specifically for a device type of "television." The audio intermediary module 125 then presents a list of the wireless network audio broadcast devices 110 to the user via a display that is integrated with or coupled to the wireless network mobile computing device 120.

In the embodiment illustrated in FIG. 4B, the audio intermediary module 125 exchanges capability messages 410 with only those wireless devices 405 that are also operating as wireless network audio broadcast devices 110. For example, the audio intermediary module 125 may send a capability query that is qualified by a device type such as "audio source" or "television," so that only the wireless network audio broadcast device 405-T1 and the wireless network audio broadcast device 405-T2 respond. In contrast, the embodiment of audio intermediary module 125 shown in FIG. 4A sends a general capability query, so that the notebook computer 405-N, the game station 405-G, and the headset 405-H also respond. In some embodiments, the audio intermediary module 125 further discovers which audio broadcast devices provide audio programming over the wireless PAN 105. That is, embodiments are contemplated in which devices produce audio for local consumption, but are not capable of, or are not configured to, provide the audio to a wireless network audio listening device 115 over the wireless PAN 105.

Figure 5A:
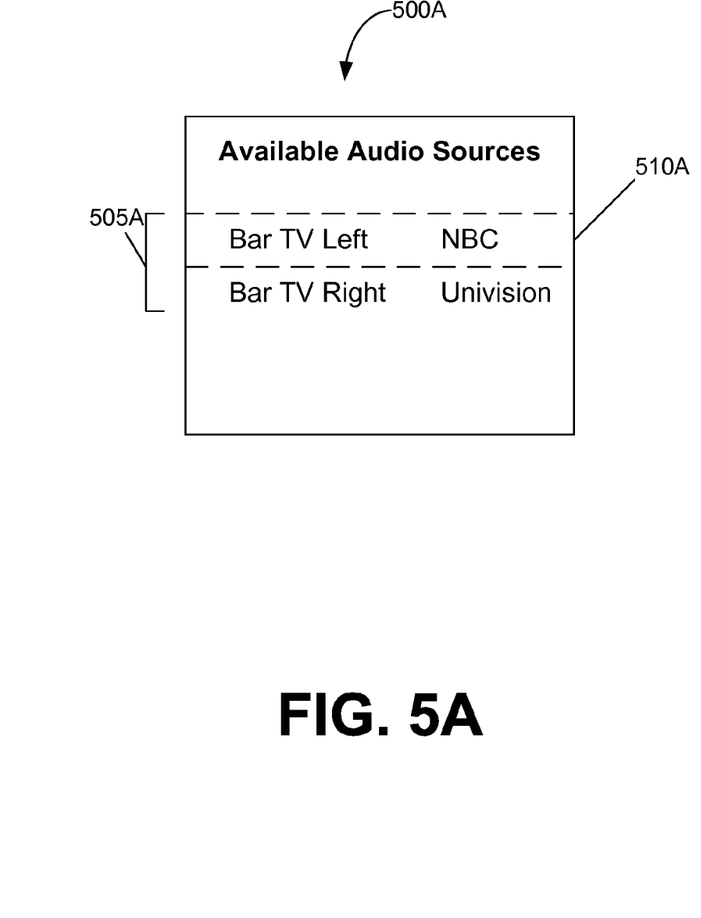
FIGS. 5A and 5B each illustrate a user interface provided by the mobile wireless computing device of FIG. 1 according to some embodiments disclosed herein.

Regardless of whether the audio intermediary module 125 filters out devices other than audio broadcasts or specifically targets devices, the audio intermediary module 125 then presents a list of the wireless network audio broadcast devices 110 to the user via a display that is integrated with or coupled to wireless network mobile computing device 120. FIG. 5A illustrates an example user interface 500A presented by the audio intermediary module 125 (FIG. 1), through which a list of discovered wireless network audio broadcast devices 110 (FIG. 1) is presented to a user of the wireless network mobile computing device 120 (FIG. 1). While the term list is used herein, no particular arrangement such as a linear arrangement is implied. The list 505A corresponds to the wireless network audio broadcast devices 110 discovered in the scenario of FIGS. 4A and 4B, and thus includes entries for the television 405-T1 and the television 405-T2 (but not for the notebook computer 405-N and the game station 405-G). After the user makes a selection 510A of one of the wireless network audio broadcast devices 110 on the list 505A, the audio intermediary module 125 begins listening to a digital audio stream.

Entries in list 505A may include various types of information that may aid the user in making a selection. For example, a list entry may include information such as a name or description of the wireless network audio broadcast device 110 (e.g., "Bar TV Left," "Bar TV Right"). In embodiments in which the digital audio stream provided by a wireless network audio broadcast device 110 is associated with a media channel or program, a list entry may also include a name or description of the media channel or program (e.g., "NBC", "Univision").

Figure 5B:
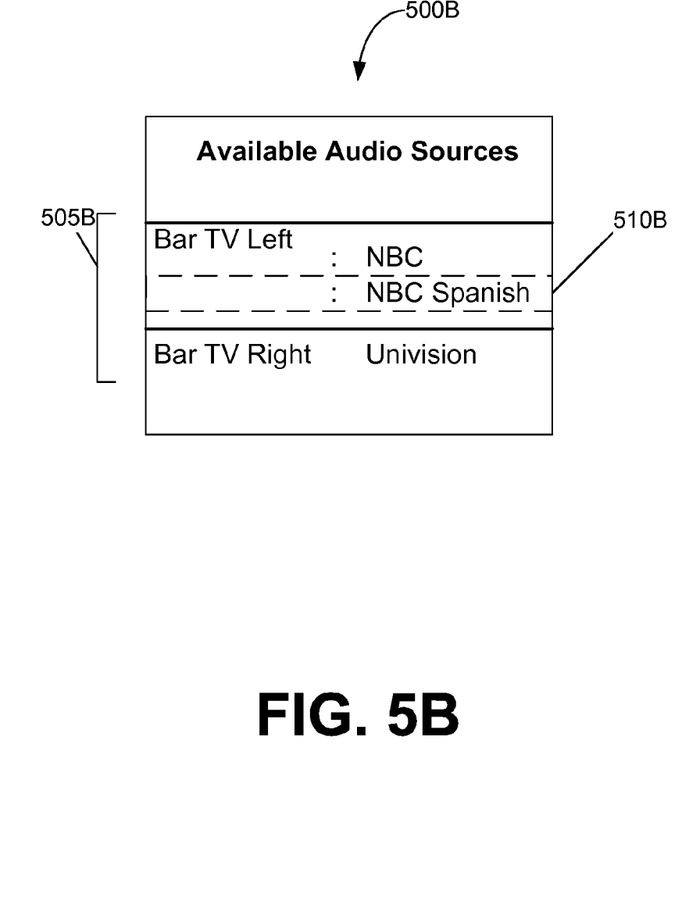

FIG. 5B illustrates another example user interface 500B presented by the audio intermediary module 125. User interface 500B presents not only a list 500B of discovered wireless network audio broadcast devices 110 (FIG. 1), but also information about the digital audio streams associated with each wireless network audio broadcast device 110. In this example, a single wireless network audio broadcast device 110 ("Bar TV Left") offers two different streams: "NBC" and "NBC Spanish." User interface 500B allows the user to select, from a list 505B, a particular stream offered by a particular wireless network audio broadcast device 110. After the user makes a selection 510B of a stream from list 505B, audio intermediary module 125 begins listening to the selected digital audio stream.

While some embodiments of the audio intermediary module 125 allow a user to choose from multiple wireless network audio broadcast devices 110, other embodiments may make a default choice without user intervention. For example, the audio intermediary module 125 may select the broadcast source that is closest to the wireless network audio listening device 115, or may select a broadcast source based on the type of device or programming (e.g., television preferred over radio, English language programming preferred over Spanish language programming, etc.).

As described herein, the audio intermediary module 125 allows a user to choose a wireless network audio broadcast device 110 for listening from a list of available broadcast sources. The audio intermediary module 125 may also provide a mechanism which allows a user to select from among multiple wireless network audio listening devices 115. Such an embodiment may be useful in a scenario where two headsets are present in the same room as the user, and he wishes to listen to a wireless network audio broadcast device 110 while in that room. Also, though not specifically illustrated, the audio intermediary module 125 may also provide a user interface or other mechanism for a user to stop or disable the digital audio stream provided by a wireless network audio broadcast device 110 to a wireless network audio listening device 115.

Notably, in some embodiments the transmission of a digital audio stream over a wireless PAN 105 by a wireless network audio broadcast device 110 is independent of audio provided to a local consumer. That is, a television 110-T transmitting a stream to a wireless network audio listening device 115 may or may not be reproducing that same stream using speakers colocated with the television. A television 110-T may be reproducing a different stream instead, or may not be producing a stream at all, for example, if the sound is muted. Thus, a television 110-T may be playing the audio associated with one TV program over local speakers and sending the sound for another TV program to a wireless network audio listening device 115. Furthermore, a given wireless network audio broadcast device 110 may support simultaneous transmission of multiple digital audio streams.

Figure 6:
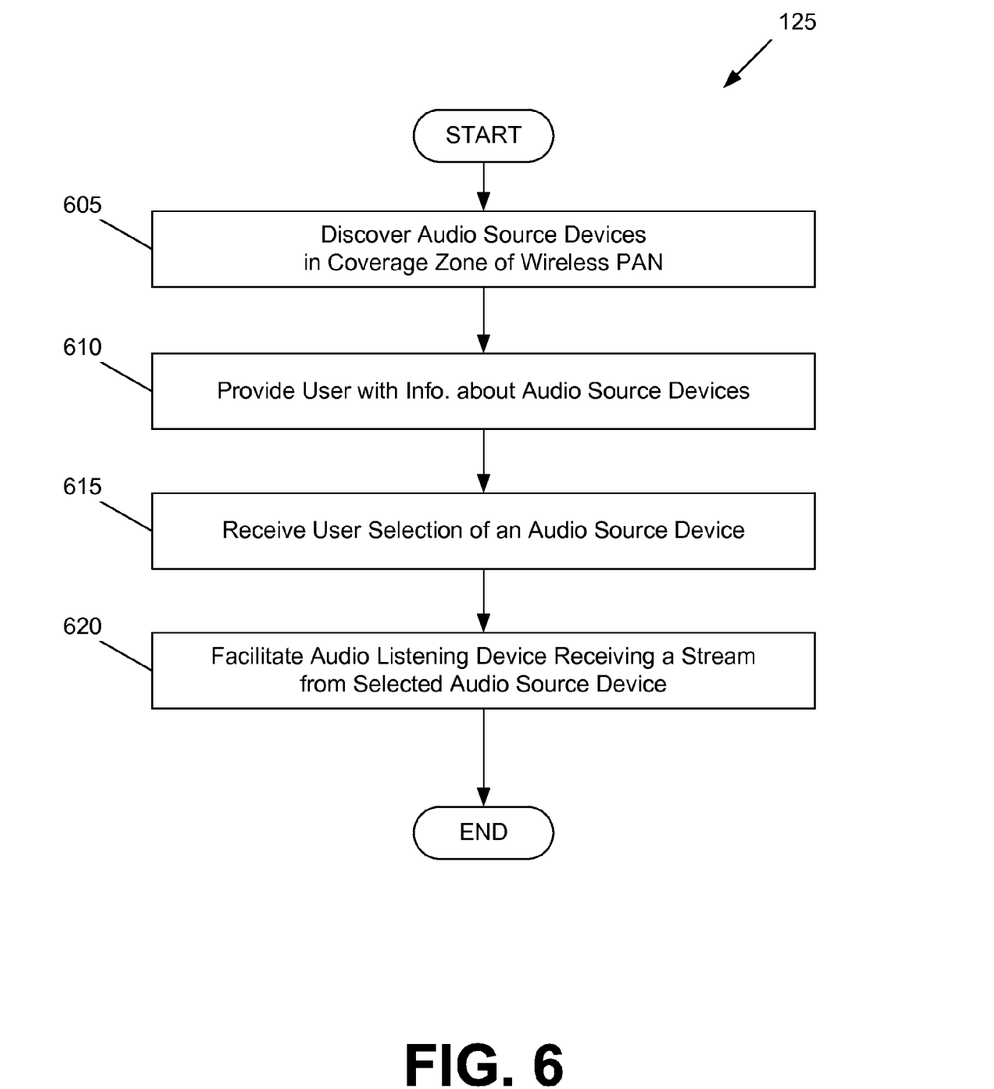
FIG. 6 is a flow chart illustrating operation of the audio intermediary module of FIG. 1 according to some embodiments disclosed herein.

FIG. 6 is a flow chart illustrating operations of audio intermediary module 125 within the wireless network mobile computing device 120 (FIG. 1), according to some embodiments disclosed herein. Alternatively, the flowchart of FIG. 6 may be viewed as implementing various steps of a method to discover an audio broadcast source that is transmitting a digital audio stream and to facilitate reception of the audio stream by an audio listener, as performed by the wireless network mobile computing device 120.

At box 605, the audio intermediary module 125 discovers the wireless network audio broadcast devices 110 (FIG. 1) that are in the coverage zone of a wireless PAN 105. As noted above, in some scenarios the audio intermediary module 125 and/or the wireless network audio broadcast device 110 have not joined the wireless PAN 105. The audio intermediary module 125 may make this discovery through a general query of all wireless devices or a targeted query of wireless network audio broadcast devices 110. The audio intermediary module 125 may further discover additional information from the wireless network audio broadcast devices 110, such as which programs or streams are available from each wireless network audio broadcast device 110.

At box 610, the audio intermediary module 125 provides information about the discovered wireless network audio broadcast devices 110 to a user of the wireless network mobile computing device 120. At box 615, the audio intermediary module 125 receives from the user a selection of a particular wireless network audio broadcast device 110.

At box 620, the audio intermediary module 125 facilitates reception by a wireless audio listening device 115 of a digital audio stream that is produced by the selected wireless network audio broadcast device 110. The reception occurs over the wireless PAN 105 (FIG. 1). The process of FIG. 6 is then complete.

Figure 7:
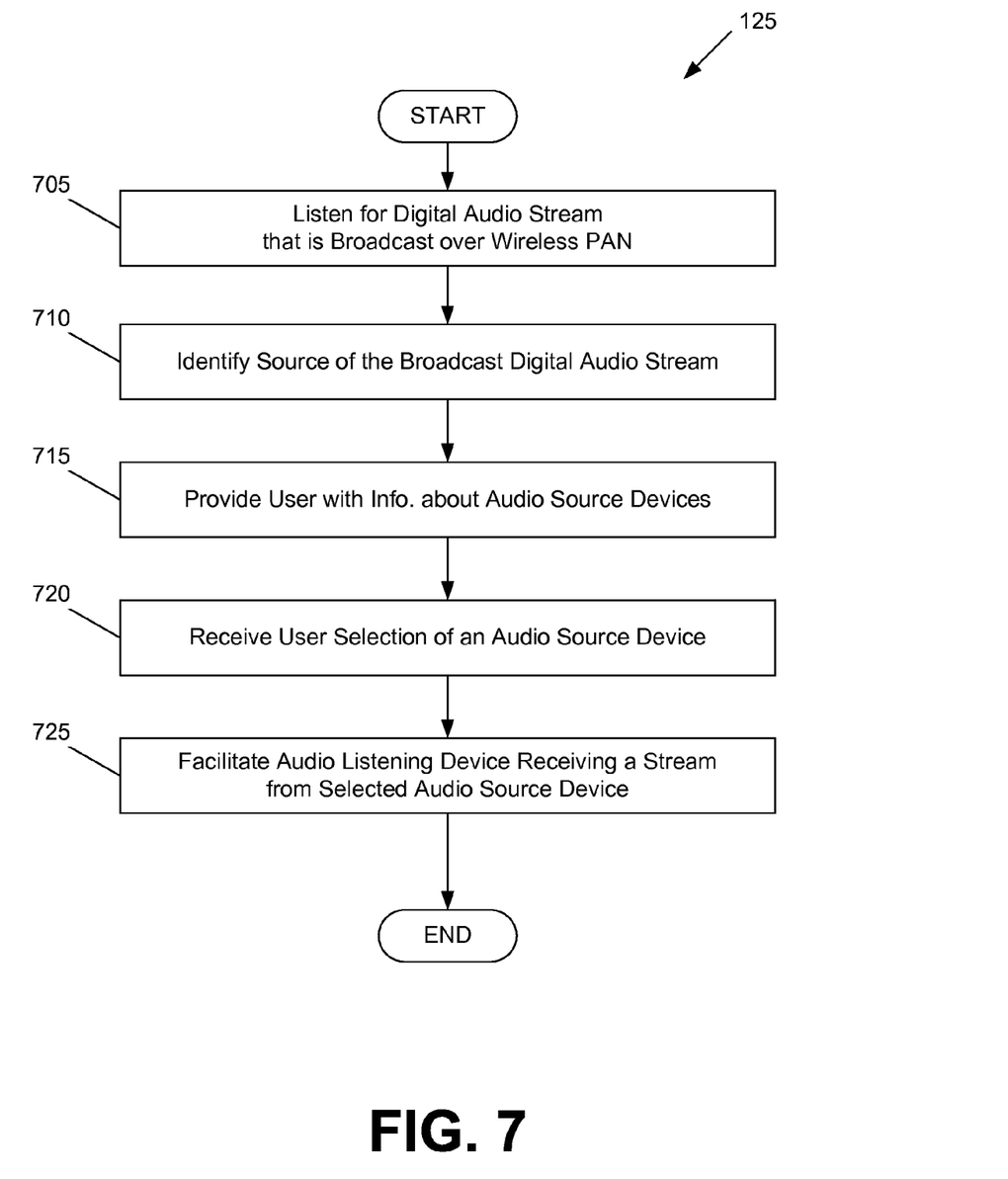
FIG. 7 is a flow chart illustrating operation of the audio intermediary module of FIG. 1 according to some embodiments disclosed herein.

FIG. 7 is a flow chart illustrating operations of audio intermediary module 125 within the wireless network mobile computing device 120 (FIG. 1), according to some embodiments disclosed herein. Alternatively, the flowchart of FIG. 7 may be viewed as implementing various steps of a method to facilitate reception of digital audio stream by a wireless audio listening device 115, as performed by the wireless network mobile computing device 120.

At box 705, the audio intermediary module 125 listens for a digital audio stream that is broadcast over a wireless PAN 105. As noted above, in some scenarios the audio intermediary module 125 and/or broadcasting device have not joined the wireless PAN 105. The audio intermediary module 125 may listen on a predefined broadcast address or set of broadcast addresses. Next, at box 710, the audio intermediary module 125 identifies the source of the received broadcast through a general query of all wireless devices or a targeted query of wireless network audio broadcast devices 110. The audio intermediary module 125 may further discover additional information from the wireless network audio broadcast devices 110, such as which programs or streams are available from each wireless network audio broadcast device 110.

At box 715, the audio intermediary module 125 provides information about the discovered wireless network audio broadcast devices 110 to a user of the wireless network mobile computing device 120. At box 720, the audio intermediary module 125 receives from the user a selection of a particular wireless network audio broadcast device 110.

At box 725, the audio intermediary module 125 facilitates reception by an audio listening device of a digital audio stream that is produced by the selected wireless network audio broadcast device 110. The reception occurs over the wireless PAN 105 (FIG. 1). The process of FIG. 7 is then complete.

Figure 8:
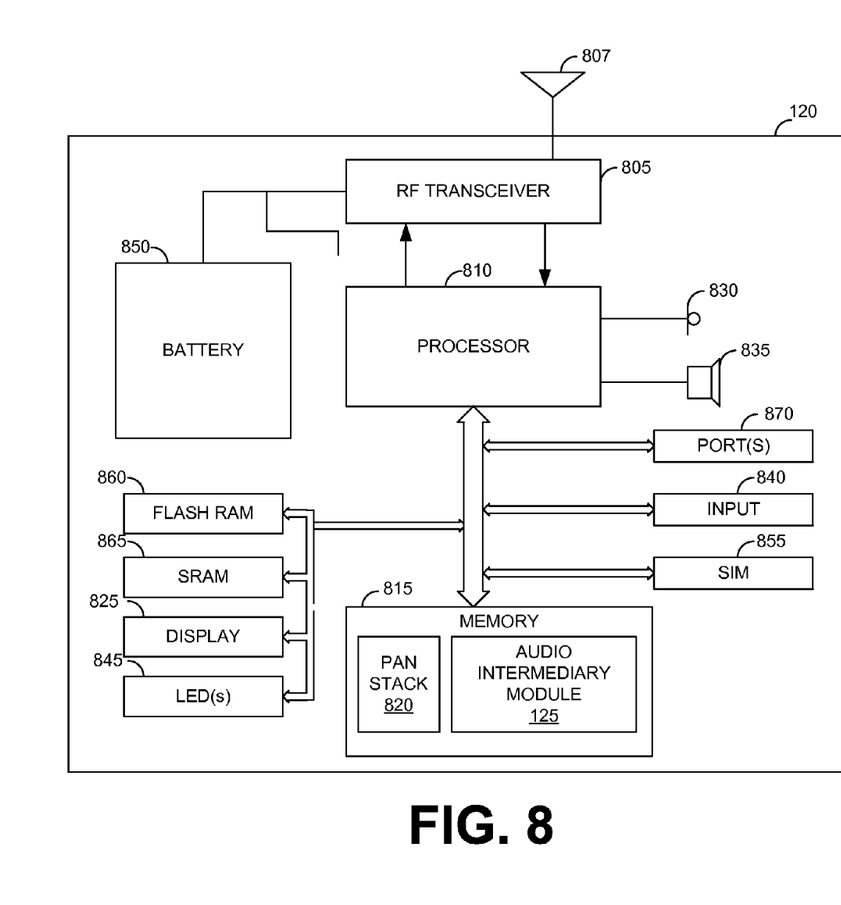
FIG. 8 is a block diagram of the mobile wireless computing device of FIG. 1 according to some embodiments disclosed herein.

FIG. 8 is a block diagram of a wireless network mobile communication device 120 according to various embodiments of the present disclosure. The wireless network mobile computing device 120 of FIG. 8 includes an RF transceiver 805, an antenna 807, a processor 810, a memory 815, and various other components contained within a housing (not shown). In this example embodiment, the audio intermediary module 125 resides in the memory 815 and takes the form of instructions executed by the processor 810. The personal area network (PAN) stack 820 also resides in the memory 815 and is executed by the processor 810. The audio intermediary module 125 may utilize the PAN stack 820 as may be appreciated.

The processor 810 may perform functions such as physical layer processing, link layer processing, and speech coding and decoding. The processor 810 may be implemented as a baseband processor, a digital signal processor (DSP), an application processor, a microcontroller, a network processor, or combinations thereof. In some embodiments, the processor 810, the memory 815, and/or the RF transceiver 805 may be integrated on the same chip.

The processor 810 may also interact with the various other systems and components in the wireless network mobile computing device 120, such as a display 825, a microphone 830, a speaker 835, a user input device 840, LEDs 845 and other components that might be incorporated into a mobile device. The user input device 840 can include a capacitive touchscreen that is integrated within the display 825, a keypad, other buttons or switches, or any other user input device as can be appreciated.

The wireless network mobile computing device 120 can also include a battery 850 or other power source that can provide power to the various components in the terminal. The wireless network mobile computing device 120 can also include one or more Subscriber Identification Module (SIM) ports 855, a flash RAM 860, an SRAM 865, or other system resources. The wireless network mobile computing device 120 can also include one or more ports 870, which can comprise a universal serial bus (USB) port and its variants (e.g., micro-USB, mini-USB, etc.), a proprietary port, or any other input/output ports that can provide for data operations as well as power supply that can facilitate charging of the battery 850.

Any logic or application described herein (including the audio intermediary module 125) that comprises software or code can be embodied in any transitory or non-transitory computer-readable medium for use by or in connection with an instruction execution system such as, for example, the processor 810. In this sense, the logic may comprise, for example, statements including instructions and declarations that can be fetched from the computer-readable medium and executed by the processor 810. In the context of the present disclosure, a "computer-readable medium" can be any medium that can contain, store, maintain, or propagate the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the audio intermediary module 125, the network stack 820, and other various components described herein may be embodied in software, firmware, or code executed by a processor as discussed above, as an alternative the same may also be embodied in dedicated hardware or a combination of software, general-purpose hardware, and dedicated hardware. If embodied in dedicated hardware, each can be implemented as a circuit or state machine that employs any one of or a combination of a number of technologies. These technologies may include, but are not limited to, discrete logic, a programmable logic device, an application specific integrated circuit (ASIC), a field programmable gate array (FPGA), a system on chip (SoC), a system in package (SiP), or any other hardware device having logic gates for implementing various logic functions upon an application of one or more data signals. Such technologies are generally well known by those skilled in the art and, consequently, are not described in detail herein.

The diagram of FIG. 8 shows the functionality and operation of an implementation of portions of the audio intermediary module 125. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processor 810 in a computer system or other system. The machine code may be converted from the source code, etc. If embodied in hardware, each block may represent a circuit or a number of interconnected circuits to implement the specified logical function(s).

Although the diagram of FIG. 7 shows a specific order of execution, it is understood that the order of execution may differ from that which is depicted. For example, the order of execution of two or more blocks may be scrambled relative to the order shown. Also, two or more blocks shown in succession in the diagram of FIG. 7 may be executed concurrently or with partial concurrence. Further, in some embodiments, one or more of the blocks shown in the diagram of FIG. 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure. It is understood that the diagram of FIG. 7 merely provides an example of the many different types of functional arrangements that may be employed to implement the operation of portion(s) of the audio intermediary module 125 as described herein. As an alternative, the FIG. 7 may be viewed as depicting an example of steps of a method implemented in the audio intermediary module 125 according to one or more embodiments.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A device comprising:
   at least one processor circuit configured to:
      identify a first wireless device configured to broadcast a wireless service over a wireless personal area network;
      receive information for connecting to the first wireless device to access the wireless service; and
      transmit, to a second wireless device, the information for connecting to the first wireless device to access the wireless service, wherein a transmission corresponding to the wireless service that is received by the second wireless device bypasses the device and the second wireless device is not a member of the wireless personal area network prior to connecting to the first wireless device to access the service.

2. The device of claim 1, wherein the information comprises an identifier associated with the first wireless device.

3. The device of claim 1, wherein the first wireless device is configured to provide the wireless service simultaneously to a plurality of devices including the device and the second wireless device.

4. The device of claim 1, wherein the wireless service comprises transmitting data to the second wireless device over the wireless personal area network.

5. The device of claim 1, wherein the at least one processor circuit is further configured to:
   connect to the first wireless device based at least in part on the information.

6. The device of claim 1, wherein the at least one processor circuit is further configured to:
   receive at least one capability information item associated with the second wireless device;
   establish a direct connection with the second wireless device based at least in part on the at least one capability information item; and
   provide, over the direct connection, the information for connecting to the first wireless device.

7. The device of claim 6, wherein the second wireless device is not configured to exchange capabilities with the first wireless device prior to connecting to the first wireless device.

8. The device of claim 1, wherein the wireless personal area network comprises at least one of a Wi-Fi network or a Bluetooth network.

9. The device of claim 1, wherein the first wireless device is configured to provide the wireless service independent of any requests for the wireless service.

10. A method comprising:
    discovering, by an intermediary device, a first device configured to broadcast a service;
    identifying, by the intermediary device, information for accessing the service directly from the first device; and
    transmitting, by the intermediary device and to a second device, the information for accessing the service directly from the first device, wherein a transmission corresponding to the service that is received by the second device bypasses the intermediary device, wherein the service is provided over a wireless personal area network and the second device is not a member of the wireless personal area network prior to connecting to the first device to access the service.

11. The method of claim 10, wherein wireless personal area network comprises at least one of a Wi-Fi network or a Bluetooth network.

12. The method of claim 10, wherein the second device is not configured to exchange capabilities with the first device prior to connecting to the first device.

13. The method of claim 10, wherein the first device is configured to provide the service independent of any requests for the service.

14. The method of claim 10, wherein the information comprises an identifier associated with the first device.

15. The method of claim 10, wherein the first device is configured to provide the service simultaneously to a plurality of devices.

16. The method of claim 10, wherein the first device, the second device, and the intermediary device are physically separate devices.

17. A computer program product comprising instructions stored in a non-transitory computer-readable storage medium, the instructions comprising:
    instructions to discover, by an intermediary device, a first device configured to broadcast data on a wireless personal area network to a plurality of devices;
    instructions to identify information for receiving at least a portion of the data directly from the first device; and
    instructions to transmit, to a second device, the information for receiving the at least the portion of the data directly from the first device, transmission of the at least the portion of the data bypassing the intermediary device, wherein the second device is not a member of the wireless personal area network when the information is transmitted.

18. The computer program product of claim 17, further comprising:
    instructions to receive at least one capability information item associated with the second device;
    instructions to establish a direct connection with the second device based at least in part on the at least one capability information item; and
    instructions to provide, to the second device and over the direct connection, the information for connecting to the first device.

19. The computer program product of claim 18, wherein the second device is not configured to exchange capabilities with the first device prior to connecting to the first device.

20. The computer program product of claim 17, wherein the information comprises an identifier associated with the first device.

* * * * *